United States Patent
Cai et al.

(10) Patent No.: US 11,741,918 B1
(45) Date of Patent: Aug. 29, 2023

(54) DISPLAY WITH A VIGNETTING MASK

(71) Applicant: Apple Inc., Cupertino, CA (US)

(72) Inventors: Shengchang Cai, Sunnyvale, CA (US); Sheng Zhang, San Jose, CA (US); Sterling G. Orsten, Santa Clara, CA (US); Shereef Shehata, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/511,375

(22) Filed: Oct. 26, 2021

Related U.S. Application Data

(60) Provisional application No. 63/152,207, filed on Feb. 22, 2021.

(51) Int. Cl.
  *G09G 5/10* (2006.01)
  *G06F 3/01* (2006.01)
  *G09G 3/3208* (2016.01)

(52) U.S. Cl.
  CPC ............ *G09G 5/10* (2013.01); *G06F 3/013* (2013.01); *G09G 3/3208* (2013.01); *G09G 2320/0646* (2013.01); *G09G 2320/0686* (2013.01); *G09G 2354/00* (2013.01); *G09G 2360/16* (2013.01)

(58) Field of Classification Search
  CPC ............ G09G 5/10; G09G 3/3208; G09G 2320/0646; G09G 2320/0686; G09G 2354/00; G09G 2360/16; G06F 3/013
  See application file for complete search history.

(56) References Cited

U.S. PATENT DOCUMENTS

| | | | |
|---|---|---|---|
| 8,378,928 B2 | 2/2013 | Ogasawara et al. | |
| 8,451,414 B2 | 5/2013 | Nonaka | |
| 9,681,804 B2 | 6/2017 | Spitzer | |
| 9,696,598 B1 | 7/2017 | Long et al. | |
| 9,948,946 B1* | 4/2018 | Linzer | G06T 7/215 |
| 10,283,062 B2 | 5/2019 | Jin et al. | |
| 10,409,118 B1 | 9/2019 | Chang et al. | |
| 10,520,739 B1* | 12/2019 | Vlachos | G06F 3/012 |
| 10,552,016 B2 | 2/2020 | Cherna et al. | |
| 10,739,849 B2 | 8/2020 | Stafford et al. | |
| 10,748,259 B2 | 8/2020 | Rodriguez et al. | |
| 2007/0024604 A1 | 2/2007 | Jang et al. | |
| 2009/0278786 A1* | 11/2009 | Chan | G09G 3/3406 345/102 |

(Continued)

*Primary Examiner* — Antonio Xavier
(74) *Attorney, Agent, or Firm* — Treyz Law Group, P.C.; Joseph F. Guihan

(57) ABSTRACT

It may be desirable to implement a vignetting effect in a display. The vignetting effect causes the display to have a light-emitting area that gradually fades to a black, non-light-emitting area. The vignetting effect allows for the size and shape of the light-emitting area to be controlled while still being aesthetically pleasing to a viewer. To implement a vignetting mask for the vignetting effect, control circuitry in the electronic device may apply dimming factors to image data for the display. To avoid artifacts caused by the vignetting mask, an initial array of dimming factors for implementing the vignetting mask may have a range between −0.5 and 1.5. After upsampling, clamping may be performed to reduce the range of the dimming factors to between 0 and 1. Ultimately, the dimming factors are applied to image data for each frame to implement the vignetting mask in each frame.

19 Claims, 13 Drawing Sheets

(56) References Cited

U.S. PATENT DOCUMENTS

| | | | |
|---|---|---|---|
| 2016/0178940 A1 | 6/2016 | Yuan et al. | |
| 2016/0267847 A1 | 9/2016 | Chen et al. | |
| 2017/0132810 A1* | 5/2017 | Gilra | G06V 40/161 |
| 2017/0372675 A1* | 12/2017 | Cho | G09G 5/363 |
| 2018/0084232 A1 | 3/2018 | Belenkii et al. | |
| 2018/0242006 A1* | 8/2018 | Kerofsky | H04N 19/117 |
| 2018/0308413 A1* | 10/2018 | Jin | G09G 3/3607 |
| 2018/0314066 A1* | 11/2018 | Bell | G02B 27/0093 |
| 2019/0012986 A1* | 1/2019 | Kida | G09G 5/377 |
| 2019/0080666 A1* | 3/2019 | Chappalli | G09G 5/005 |
| 2019/0206335 A1* | 7/2019 | Wu | G09G 3/3426 |
| 2020/0074724 A1* | 3/2020 | Mathur | G06T 15/80 |
| 2020/0135074 A1* | 4/2020 | Wooster | G09G 3/342 |
| 2021/0149441 A1* | 5/2021 | Bartscherer | G06F 3/017 |
| 2022/0035449 A1* | 2/2022 | Cockram | G02B 27/017 |

\* cited by examiner

DISPLAY WITH A VIGNETTING MASK

This application claims the benefit of provisional patent application No. 63/152,207, filed Feb. 22, 2021, which is hereby incorporated by reference herein in its entirety.

FIELD

This relates generally to electronic devices, and, more particularly, to electronic devices with displays.

BACKGROUND

Electronic devices often include displays. For example, an electronic device may have an organic light-emitting diode (OLED) display based on organic light-emitting diode pixels. In this type of display, each pixel includes a light-emitting diode and thin-film transistors for controlling application of a signal to the light-emitting diode to produce light. The light-emitting diodes may include OLED layers positioned between an anode and a cathode. To emit light from a given pixel in an organic light-emitting diode display, a voltage may be applied to the anode of the given pixel.

It is within this context that the embodiments herein arise.

SUMMARY

An electronic device may include a display. The display may include an array of pixels such as organic light-emitting diode pixels or liquid crystal display pixels.

It may be desirable to implement a vignetting effect in the display. The vignetting effect causes the display to have a light-emitting area that gradually fades to a black, non-light-emitting area. The vignetting effect may allow for the size and shape of the light-emitting area in the display to be controlled while still being aesthetically pleasing to a viewer.

To implement a vignetting mask for the vignetting effect, control circuitry in the electronic device may apply dimming factors to image data for the display. The dimming factors may cause the gradual fade desired for the vignetting effect.

To avoid artifacts caused by the vignetting mask, an initial array of dimming factors for implementing the vignetting mask may have a range between −0.5 and 1.5. The initial array may include dimming factors for only a subset of pixels in the display. Upsampling (e.g., bilinear interpolation) may be performed to obtain dimming factors for the remaining pixels in the display.

After upsampling, clamping may be performed to reduce the range of the dimming factors to between 0 and 1. This may mitigate spatial aliasing artifacts that are concentrated in the values greater than 1. The dimming factors may also be remapped using a look-up table so that display has a desired visual appearance. Ultimately, the dimming factors are applied to image data for each frame to implement the vignetting mask in each frame.

DETAILED DESCRIPTION

Figure 1:
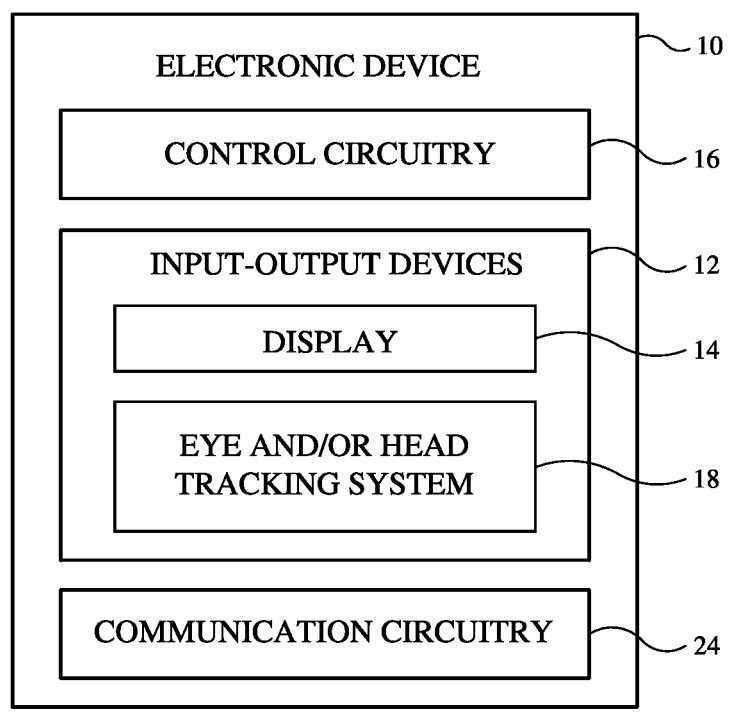
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Device 10 may include cameras and other components that form part of gaze and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). This head-location information obtained by system 18 may be used to determine the appropriate direction with which display content from display 14 should be directed. Eye and/or head tracking system 18 may include any desired number/combination of infrared and/or visible light detectors. Eye and/or head tracking system 18 may optionally include light emitters to illuminate the scene.

Figure 2:
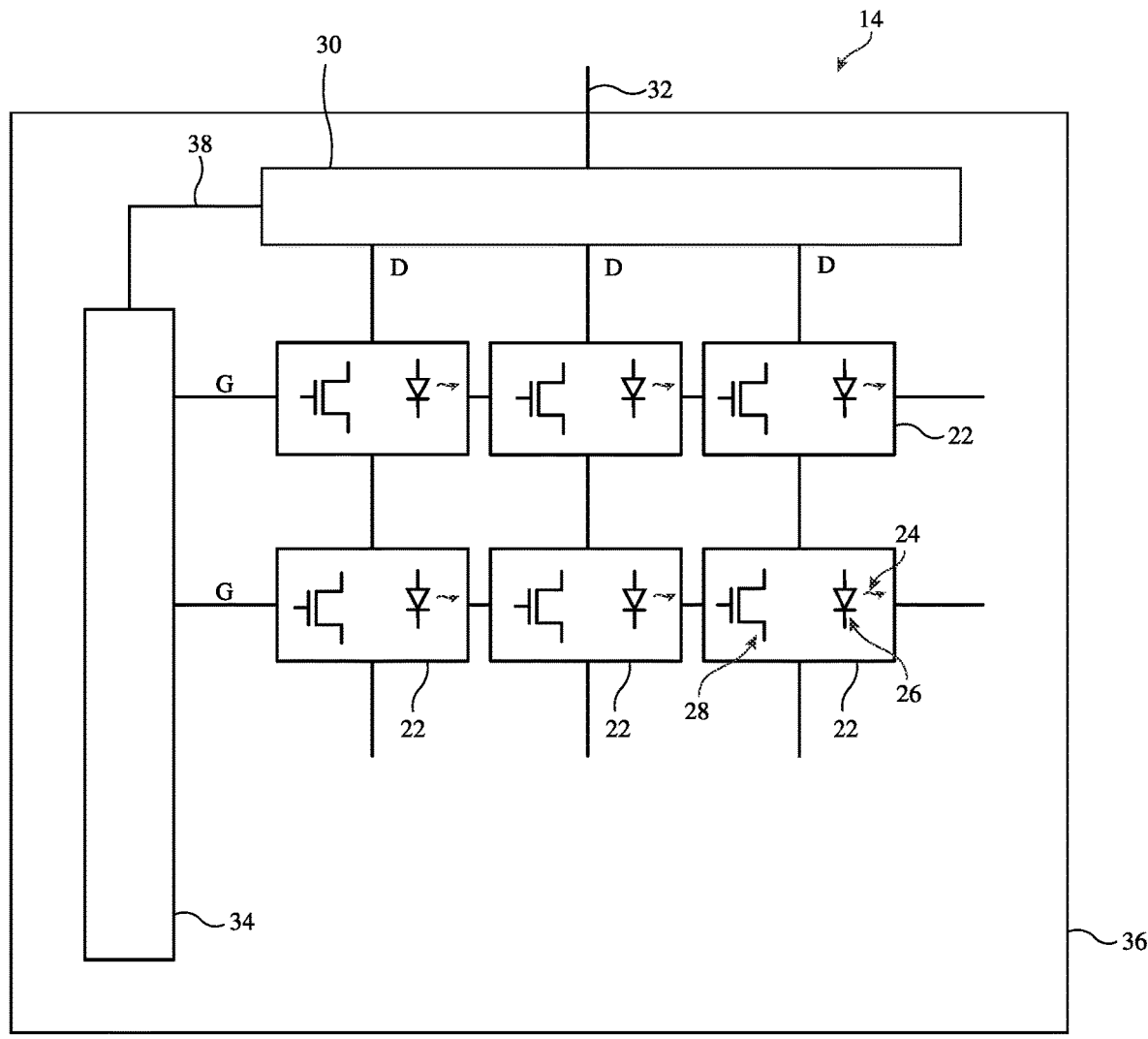
FIG. 2 is a top view of an illustrative display in an electronic device in accordance with an embodiment.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry (such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors.

Pixels 22 may contain light-emitting diodes of different colors (e.g., red, green, and blue diodes for red, green, and blue pixels, respectively) to provide display 14 with the ability to display color images.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.).

Figure 3:
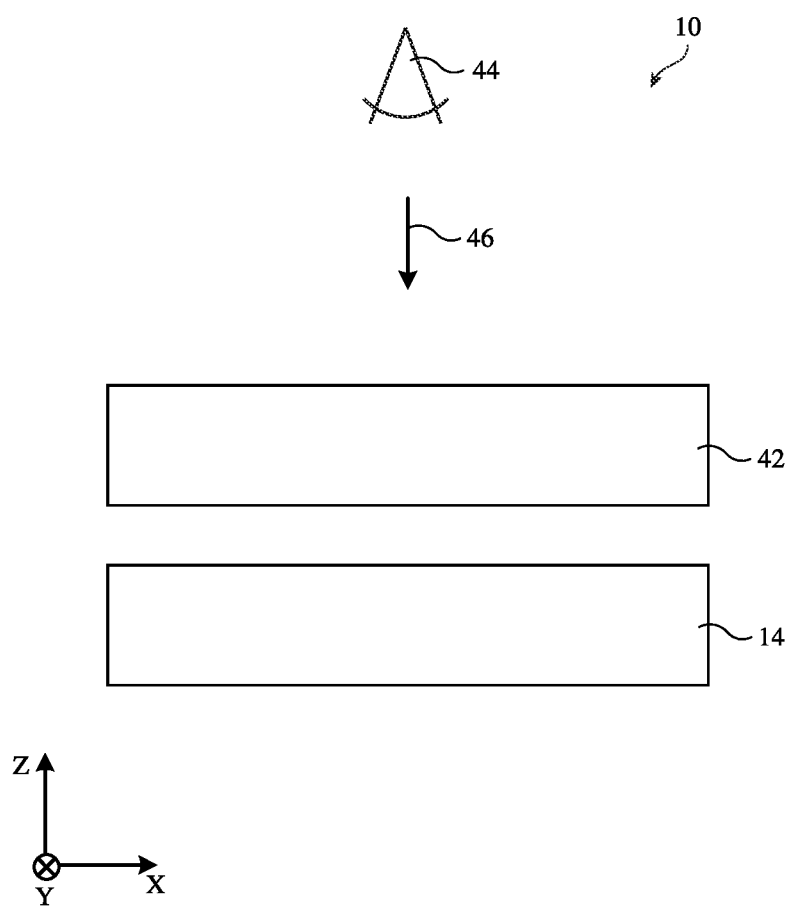
FIG. 3 is a cross-sectional side view of an illustrative electronic device with a display in accordance with an embodiment.

FIG. 3 is a cross-sectional side view of an illustrative electronic device with a display. As shown, electronic device 10 may include an optical system 42 in addition to display 14. Optical system 42 may include one or more lens elements that focus light for viewer 44. Viewer 44 facing direction 46 may view display 14 through optical system 42.

Figure 4:
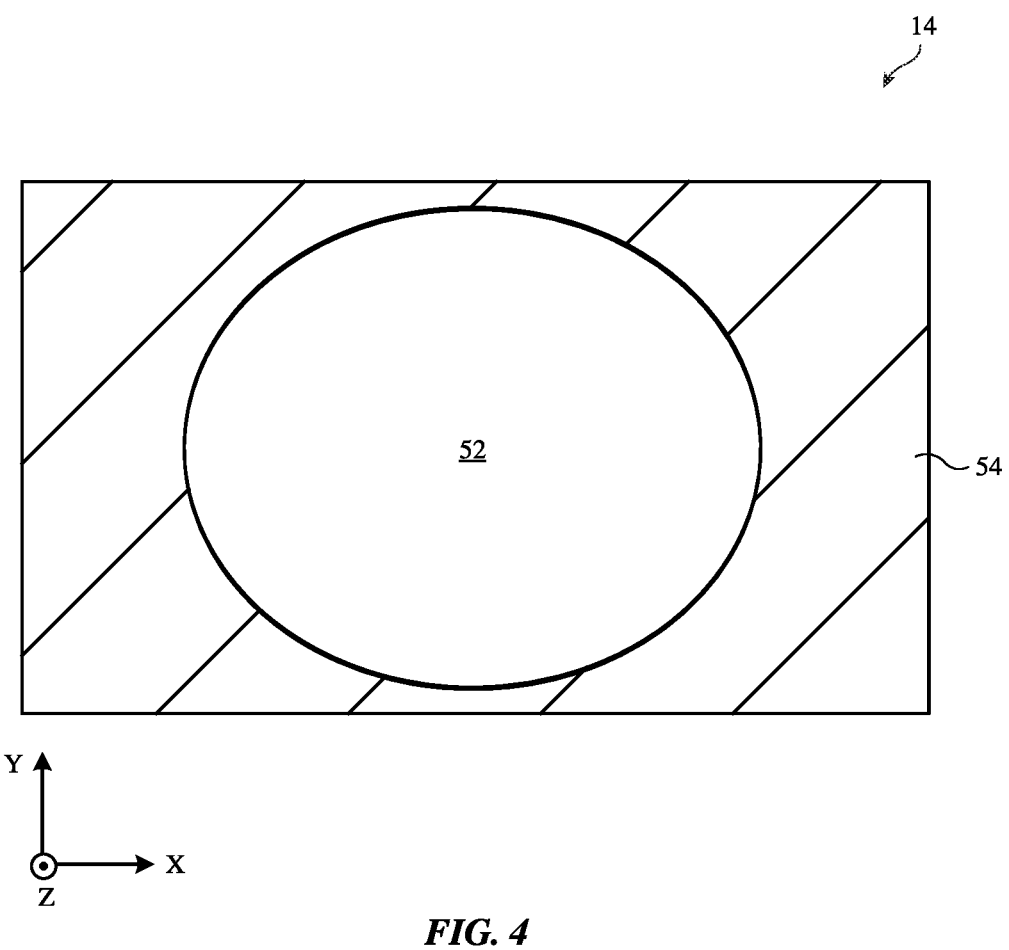
FIG. 4 is a top view of an illustrative display with a light-emitting area and a non-light-emitting area in accordance with an embodiment.

In some cases, it may be desirable to apply a mask to a display such as display 14. FIG. 4 is a top view of an illustrative display with a mask. As shown, display 14 includes a light-emitting area 52 and a non-light-emitting area 54. Pixels in the light-emitting area 52 may be used to emit light and display an image. Pixels in non-light-emitting area 54 may be turned off such that the pixels are dark (black). The non-light-emitting area may sometimes be referred to as a mask.

Figure 5:
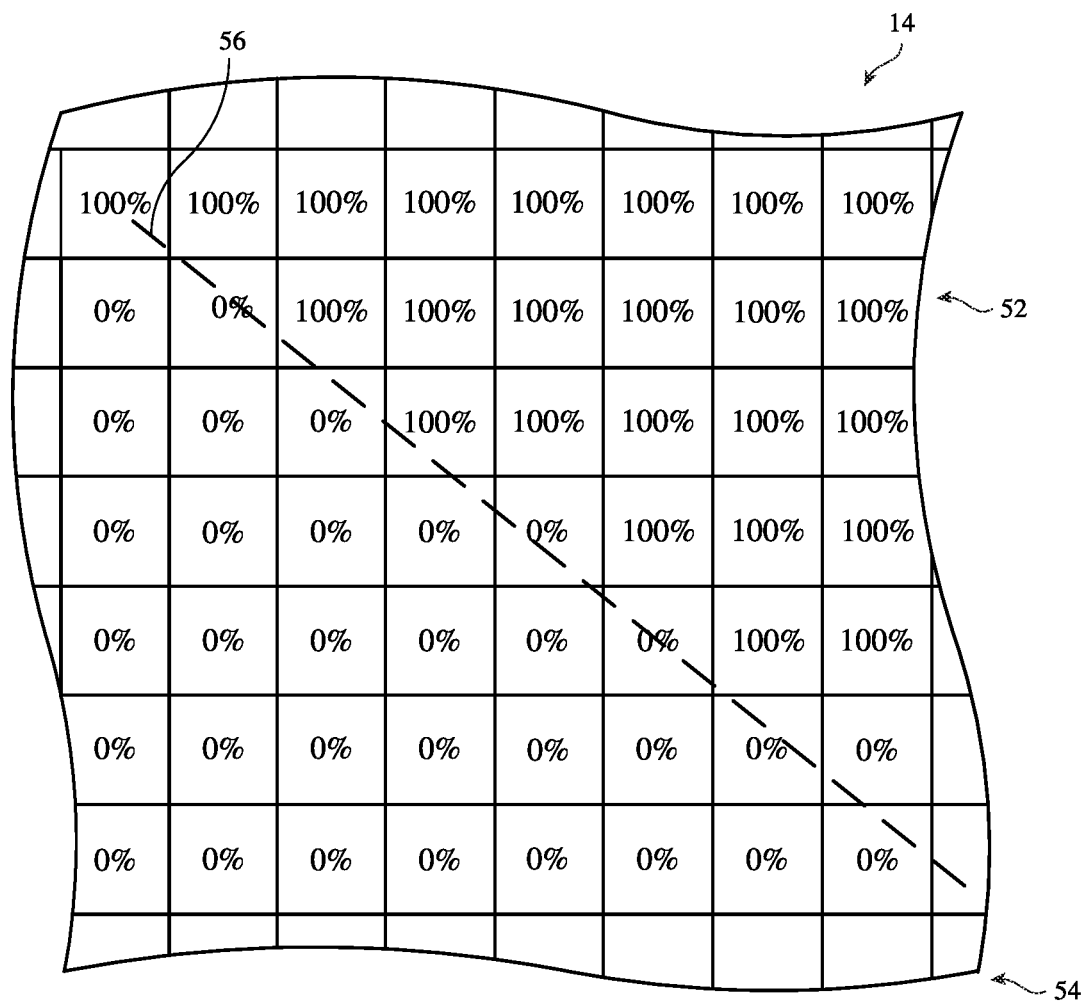
FIG. 5 is a zoomed in view of the border between the light-emitting area and the non-light-emitting area of the display of FIG. 4 in accordance with an embodiment.

In some cases, the light-emitting area may have a shape with one or more curved edges (borders). In other words, the border between the light-emitting area and the non-light-emitting area may have one or more curved portions. FIG. 5 is a zoomed in view of the border between the light-emitting area 52 and the non-light-emitting area 54 in display 14 of FIG. 4. As shown, the light-emitting area 52 includes pixels that are capable of emitting light at full brightness (e.g., 100% brightness). The pixels in non-light-emitting area 54 are turned off and therefore have brightness values capped at 0%. The full brightness pixels in light-emitting area 52 may be referred to as having a dimming factor of 1 (or 100%). The zero brightness pixels in non-light-emitting area 54 may be referred to as having a dimming factor of 0 (or 0%). The dimming factor for each pixel may be applied to (e.g., multiplied by) an initial brightness for that pixel to obtain a final brightness value for the pixel.

The light-emitting area 52 may have a target border 56. The target border 56 may have curvature. Constraints from the size and location of the pixels may prevent the target border from being perfectly followed. Therefore, the pixels may be grouped into the light-emitting area and non-light-emitting area to approximate the target border 56. However, the border may still appear jagged due each pixel being either fully on (with dimming factors of 100%) or fully off (with dimming factors of 0%).

The jagged border between light-emitting area 52 and non-light-emitting area 54 may not be aesthetically pleasing to a viewer. Therefore, a transition region may be included in the display between the light-emitting area 52 and the non-light-emitting area 54.

Figure 6:
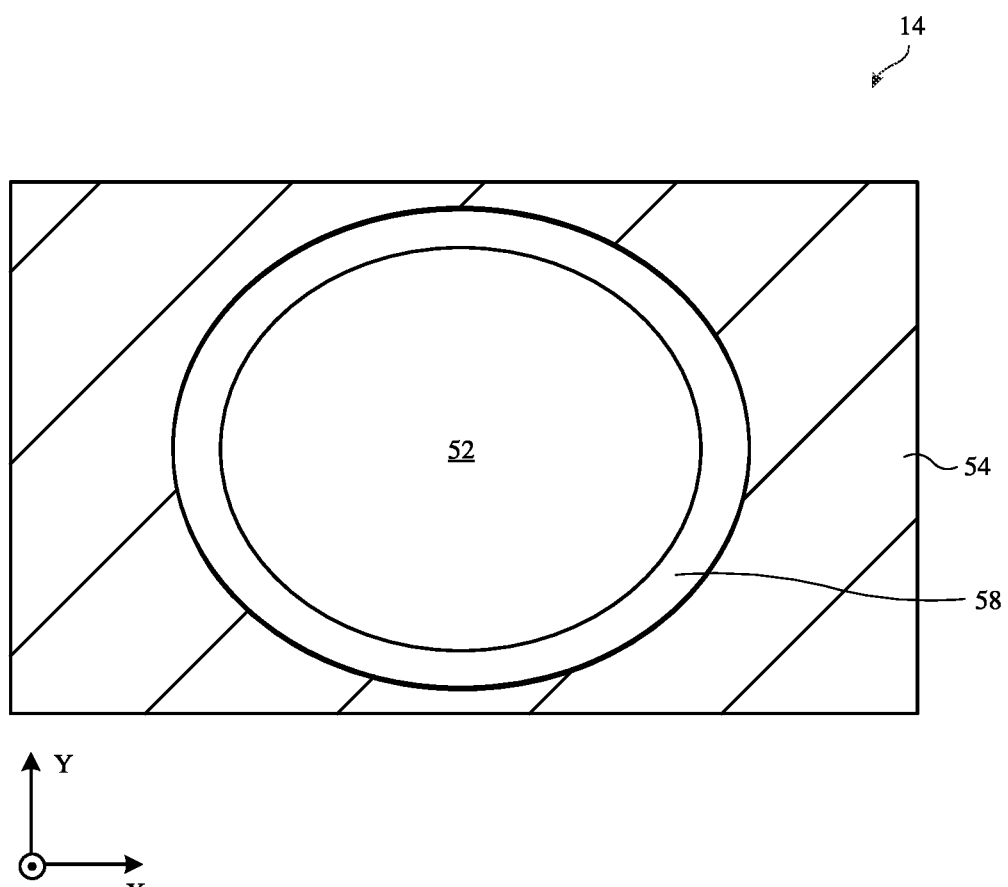
FIG. 6 is a top view of an illustrative display with a light-emitting area, a non-light-emitting area, and a transition area in accordance with an embodiment.

FIG. 6 is a top view of a display with a transition region 58 (sometimes referred to as transition area 58 or vignetting area 58) between light-emitting area 52 and non-light-emitting area 54. Transition area 58 may implement a vignetting effect in the display. In other words, the display may fade gradually in transition area 58 from a fully lit area (adjacent to light-emitting area 52) to a fully dark area (adjacent to non-light-emitting area 54).

Figure 7:
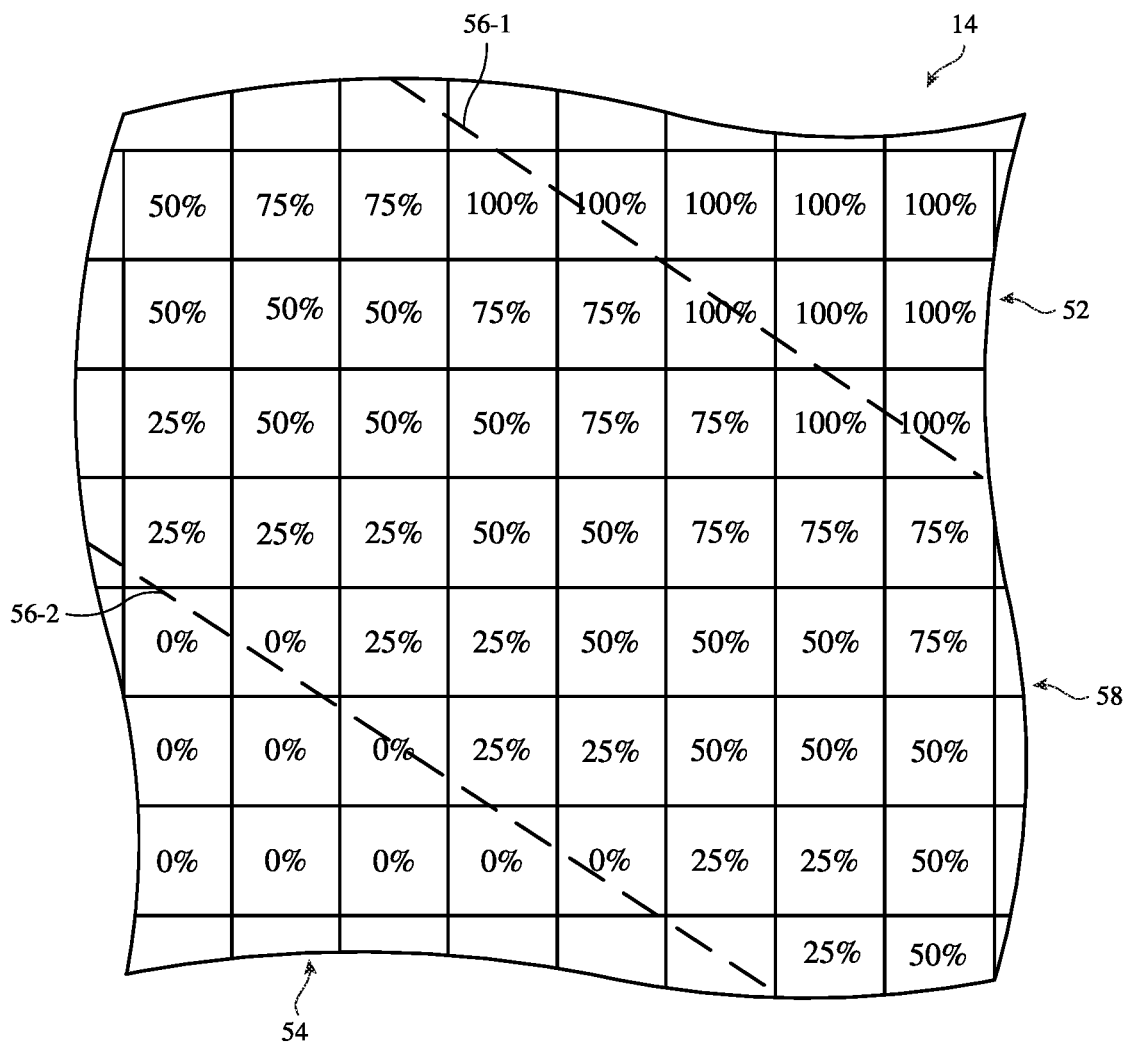
FIG. 7 is a zoomed in view of the border between the light-emitting area and the non-light-emitting area of the display of FIG. 6 in accordance with an embodiment.

FIG. 7 is a zoomed in view of the border between the light-emitting area 52 and the non-light-emitting area 54 in display 14 of FIG. 6. As shown, the light-emitting area 52 includes pixels that are capable of emitting light at full brightness (e.g., 100% dimming factors). The pixels in non-light-emitting area 54 are turned off and therefore have dimming factors of 0%. The pixels in transition region 58 may have dimming factors (sometimes referred to as gain values) that gradually dim the brightness of those pixels. In other words, there may be one or more intermediate dimming factors (greater than 0% and less than 100%) in the pixels of the transition region. In the examples of FIG. 7, the pixels in the transition region have dimming factors of 25%, 50%, or 75%. The effect to the viewer is that the image in light-emitting area 52 appears to fade to black in transition region 58 (to a fully black area in non-light-emitting area 54).

The transition region 58 may approximate a first border 56-1 at the interface of transition region 58 and light-emitting area 52 and a second border 56-2 at the interface of transition region 58 and non-light-area 54. The border shape may be selected to implement a light-emitting area of a desired shape that fades into the black background.

The specific example of transition region 58 in FIG. 7 is merely illustrative. In general, the pixels in transition region 58 may have any desired dimming factors (e.g., any values greater than 0 and less than 1). The transition region 58 may have any desired size. In general, the larger the transition region the more gradual the vignetting effect is in the display.

The dimming factors applied to each pixel may sometimes be referred to as a vignetting map. The vignetting map controls the shape and size of the light-emitting area, the non-light-emitting area, and the transition region.

There are many benefits to using a vignetting map to implement a vignetting effect in display 14. First, the vignetting map may allow the size and shape of the light-emitting area in the display to be controlled while still appearing aesthetically pleasing to the viewer.

When the display is viewed through an optical system (as shown in FIG. 3), the entire display may not be visible at one time. The visible area of the display may change depending on the position of the viewer's eye and the direction of the viewer's gaze. The display (and/or control circuitry for the display) may receive information on the user's eye position and gaze direction (e.g., from eye tracking system 18 in FIG. 1). The vignetting map may subsequently be applied such that the light-emitting area of the display corresponds with the area of the display that is viewable by the viewer. This allows for pixels outside of the viewable area to be turned off (conserving power in the device and increasing contrast in the display).

Additionally, pixels at the edge of the field-of-view of the viewer may be susceptible to chromatic aberration artifacts (e.g., due to the pixels not being visible by a camera during calibration operations). Implementing a vignetting effect may mitigate visible artifacts caused by these artifacts in uncalibrated pixels.

A display viewed through an optical system may also be susceptible to a pin-cushion effect. If the light-emitting area on the display has linear borders (e.g., at the edges of the display panel), the light-emitting area may have borders that curve inwards when viewed through the optical system. This type of border may not be aesthetically pleasing to the user. Implementing the vignetting effect in the display may ensure that the display is aesthetically pleasing when viewed through the optical system.

As another example, the field-of-view of the viewer when viewing display 14 through optical system 42 may be extend beyond the edge of display 14. This panel edge (sometimes referred to as a rendering boundary) may result in the viewer's field-of-view having an irregular and/or unpleasant shape (e.g., due to linear edges and/or right-angled corners that do not smoothly connect to the rest of the field-of-view border). The mask may therefore be used to ensure that the field-of-view is visually pleasing to the viewer, even with the limitations caused by the panel edge.

In general, regardless of the advantageous effects achieved by the non-light-emitting area, the non-light-emitting area (mask) may have any desired shape to achieve a desired field-of-view and/or aesthetic appearance for the display in device 10.

The example of using the vignetting effect in an electronic device with a display and an optical system is merely illustrative. In general, any type of device with a display may use the vignetting effect in its display.

The map of dimming factors for the pixels that is applied to the pixel brightness levels may be referred to as a vignetting map, vignetting mask (because the dimming factors selectively block or mask the pixels in the display), 2D mask, etc. In some devices, the vignetting mask may be static. In other words, regardless of the position and point of gaze of the viewer's eye, the vignetting mask may be the same (e.g., with the same size and shape). With a static vignetting mask, each pixel may have a dimming factor that is applied to that pixel in every frame. The dimming factor for a pixel does not change over time.

Figure 8A:
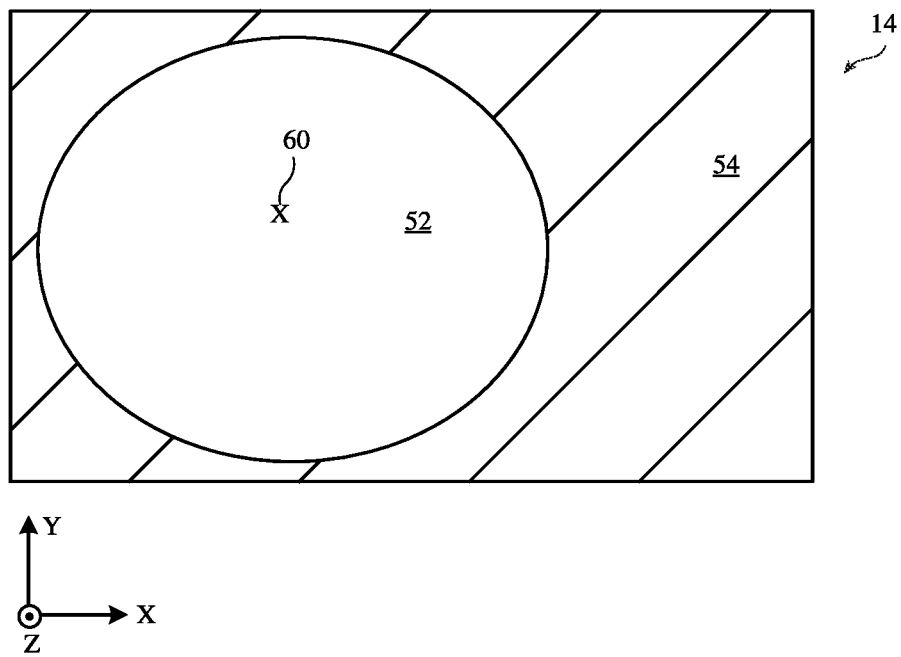
FIGS. 8A and 8B are top views of an illustrative display showing how the position of the light-emitting area and the non-light-emitting area of the display may be changed based on point of gaze information in accordance with an embodiment.
Figure 8B:
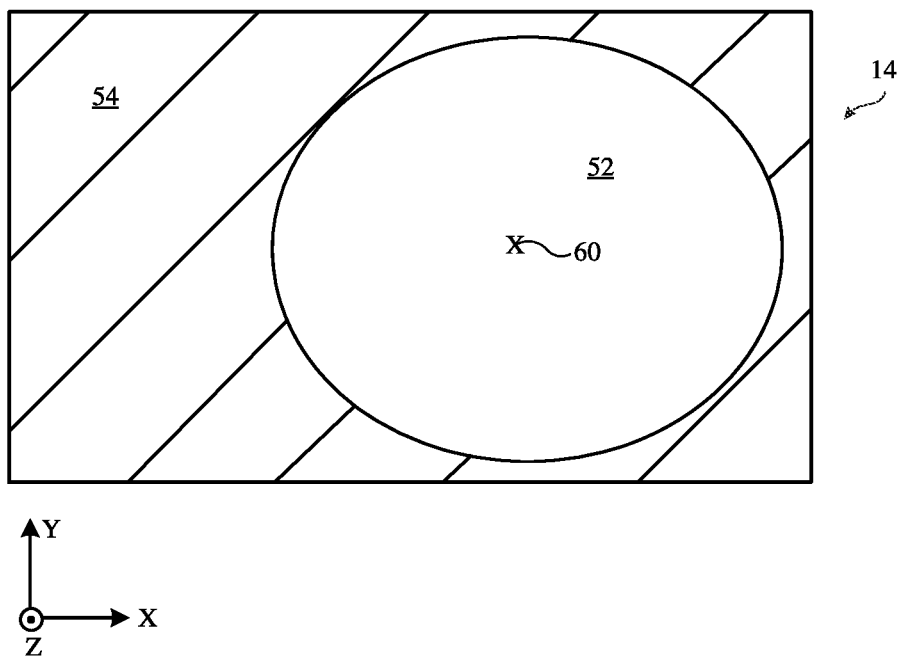

In some devices, however, the vignetting mask may be positioned dynamically based on information from eye tracking system 18. In this case, the dimming factor for a given pixel may change over time based on the changing position of the vignetting mask. An example of this type is shown in FIGS. 8A and 8B. In FIG. 8A, the viewer may have a point of gaze aligned with point 60 on the display. The light-emitting area 52 is therefore centered around point 60. The vignetting mask is used to implement a non-light-emitting area 54 around the light-emitting area. The viewer's point of gaze may then shift (e.g., in the X-direction). FIG. 8B shows the new point of gaze (aligned with point 60) that is shifted in the X-direction relative to FIG. 8A. The light-emitting area in FIG. 8B has also shifted in the X-direction relative to FIG. 8A in order to align with the new point of gaze 60.

The vignetting mask is therefore updated based on information regarding the point of gaze of the viewer's eye. The vignetting mask may also be updated based on information regarding the location of the viewer's eye. For example, the size of the light-emitting area in the vignetting mask may be adjusted based on the location of the viewer's eye.

To implement a vignetting mask, the electronic device may store a 2D vignetting map with an array of dimming factors. In one possible example, the 2D vignetting map includes one dimming factor for every pixel in the display. However, the display may include a large number of pixels (e.g., more than 1 million, more than 3 million, more than 5 million, more than 6 million, etc.). Storing dimming factors for every pixel at a 1:1 ratio would therefore require a large amount of memory (and be expensive for subsequent transport/computation steps).

To ease the memory requirements of implementing the vignetting effect, a downsampled array of dimming factors may be saved in the electronic device. The downsampled array of dimming factors may still accurately represent the target vignetting map. However, storage of a far lower number of values is required (compared to storing full resolution vignetting map).

As an example, a 64×64 array of dimming factors may be stored for the vignetting map. Bilinear interpolation may then be performed to obtain dimming factors at points between the known points from the 64×64 array. Performing bilinear interpolation to obtain dimming factors for every pixel in the array (using the 64×64 array of dimming factors from memory) is referred to as upsampling.

Using the downsampling and upsampling process as described may reduce memory and/or bandwidth demands in the device. However, if care is not taken, the downsampling and upsampling process may introduce display artifacts such as spatial aliasing. In the process described above where bilinear interpolation is the only step involved in upsampling, jagged edges may be visible in the final image due to spatial aliasing.

To avoid spatial aliasing in the final image, the initial downsampled vignetting map (e.g., a 64×64 array) may have a range of gain values between −0.5 and 1.5 (even though this includes values outside the usable range of 0 to 1). The downsampled vignetting map including dimming factors between −0.5 and 1.5 may be upsampled using bilinear interpolation.

The upsampled dimming factors (all within the range of −0.5 to 1.5) may still have spatial aliasing. However, the spatial aliasing may be concentrated in the region(s) outside the range of interest (e.g., outside of the transition area between 0 and 1). For example, the spatial aliasing may take place in an area where the gain values are between 1 and 1.5. After upsampling, the dimming factors may be clamped between 0 and 1 (which is the final range of usable values for the dimming factor). In other words, any dimming factor that is less than 0 is raised to 0 during the clamping process. Any dimming factor that is greater than 1 is lowered to 1 during the clamping process. The clamping therefore eliminates the spatial aliasing that was previously present in the range between 1 and 1.5 (since the range between 1 and 1.5 is clamped to be exclusively 1).

Figure 9A:
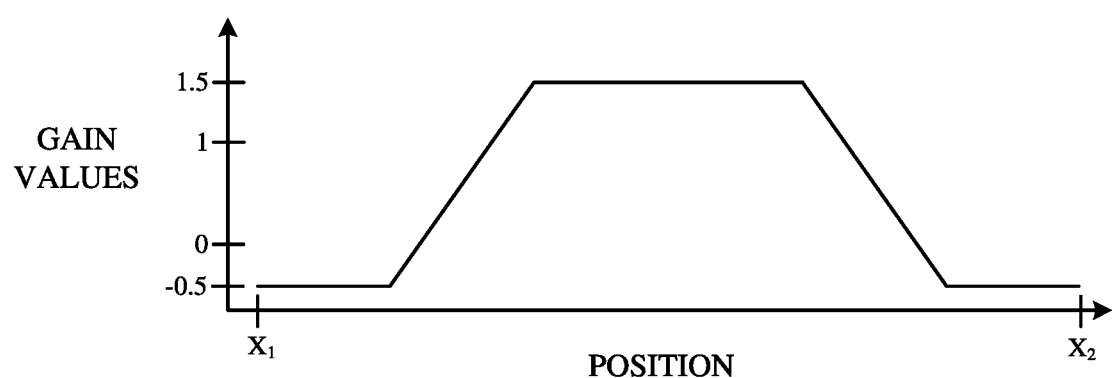
FIG. 9A is graph of gain values versus position within an illustrative display in a downsampled vignetting map in accordance with an embodiment.

FIG. 9A is a graph of gain values versus position within the display in the downsampled vignetting map. Position $x_1$ may correspond to the left edge of the display and position $x_2$ may correspond to the right edge of the display. As shown, the gain values vary between −0.5 and 1.5.

Figure 9B:
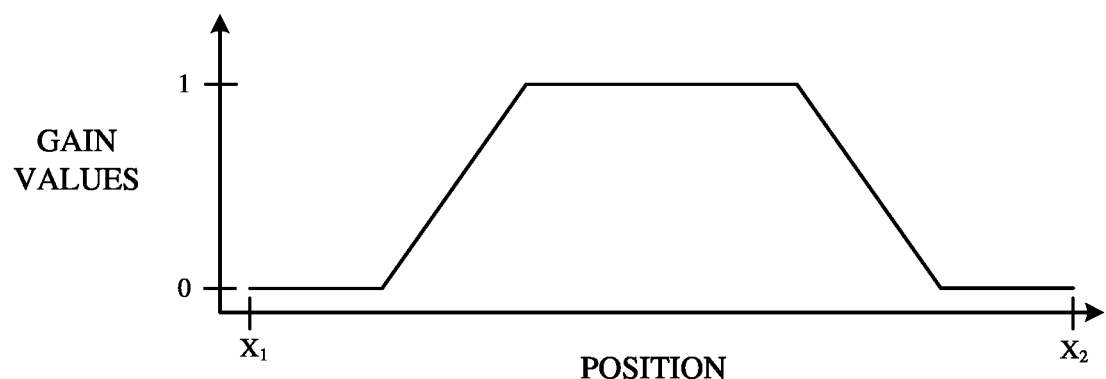
FIG. 9B is a graph of gain values versus position within an illustrative display after bilinear interpolation and clamping in accordance with an embodiment.

FIG. 9B is a graph of gain values versus position within the display after bilinear interpolation and clamping is complete. As shown, the gain values have been remapped to the usable range of between 0 and 1. However, no spatial aliasing is present in the gain values.

Figure 9C:
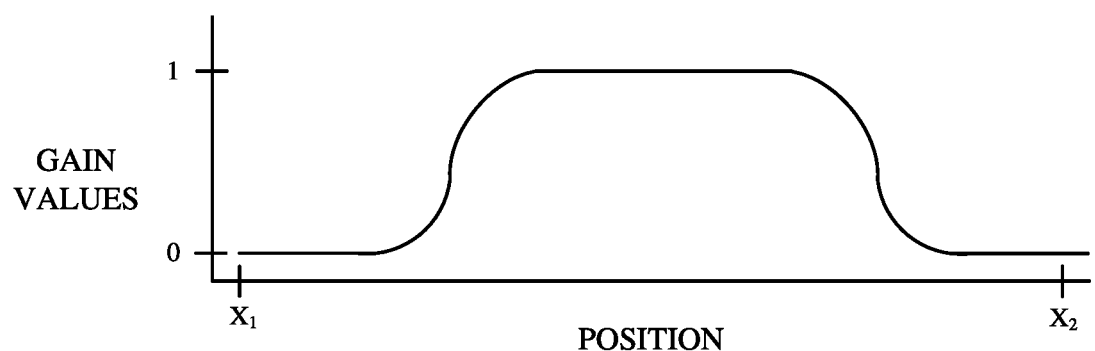
FIG. 9C is a graph of gain values versus position within an illustrative display after remapping in accordance with an embodiment.

In order to smooth the final appearance of the vignetting mask, the gain values may be remapped after upsampling. FIG. 9C is a graph of gain values versus position within the display after remapping is complete. As shown, the remapping may smoothen the transition into and out of the transition region. This may improve the appearance of the display when viewed by the viewer.

Figure 10:
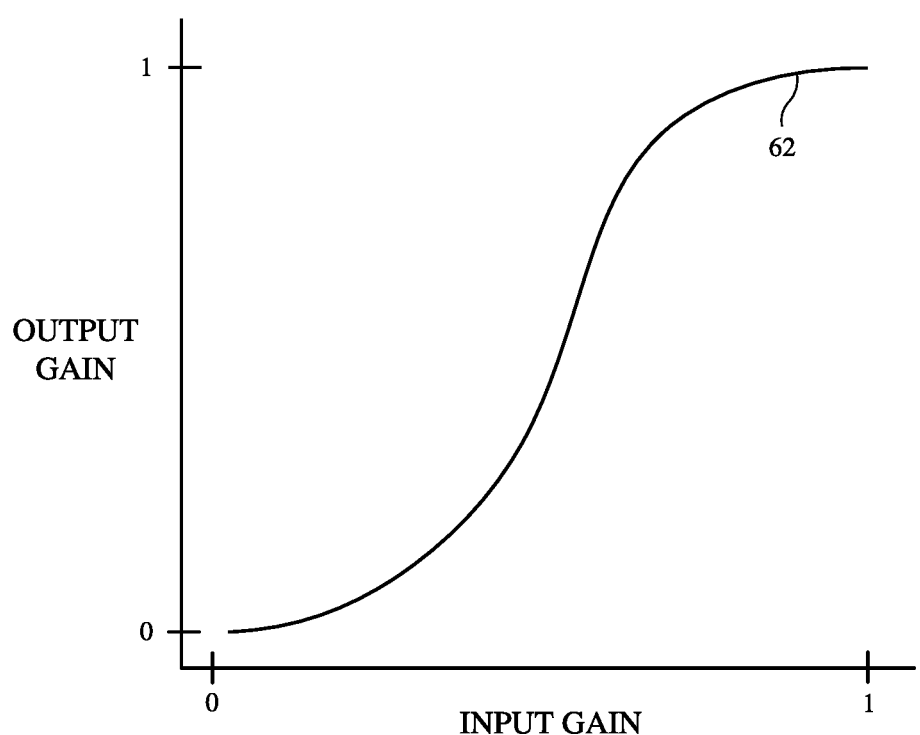
FIG. 10 is a graph of an illustrative output gain versus input gain curve that may be used during remapping of dimming factors in accordance with an embodiment.

The remapping may be performed according to a function such as the function shown in FIG. 10. As shown in FIG. 10, each input gain has a corresponding output gain as determined by profile 62. The shape of profile 62 may be selected to produce a desired appearance in the final display. As one example, low input gain values (e.g., gain values below 0.4) may be reduced by the remapping. In other words, each input gain below 0.4 (or below 0.5) may have a corresponding output gain that is lower than its respective input gain. High input gain values (e.g., gain values above 0.6) may be increased by the remapping. In other words, each output gain above 0.6 (or above 0.5) may have a corresponding output gain that is higher than its respective input gain. This example for a remapping profile is merely illustrative. In general, any desired remapping profile may be used.

Figure 11:
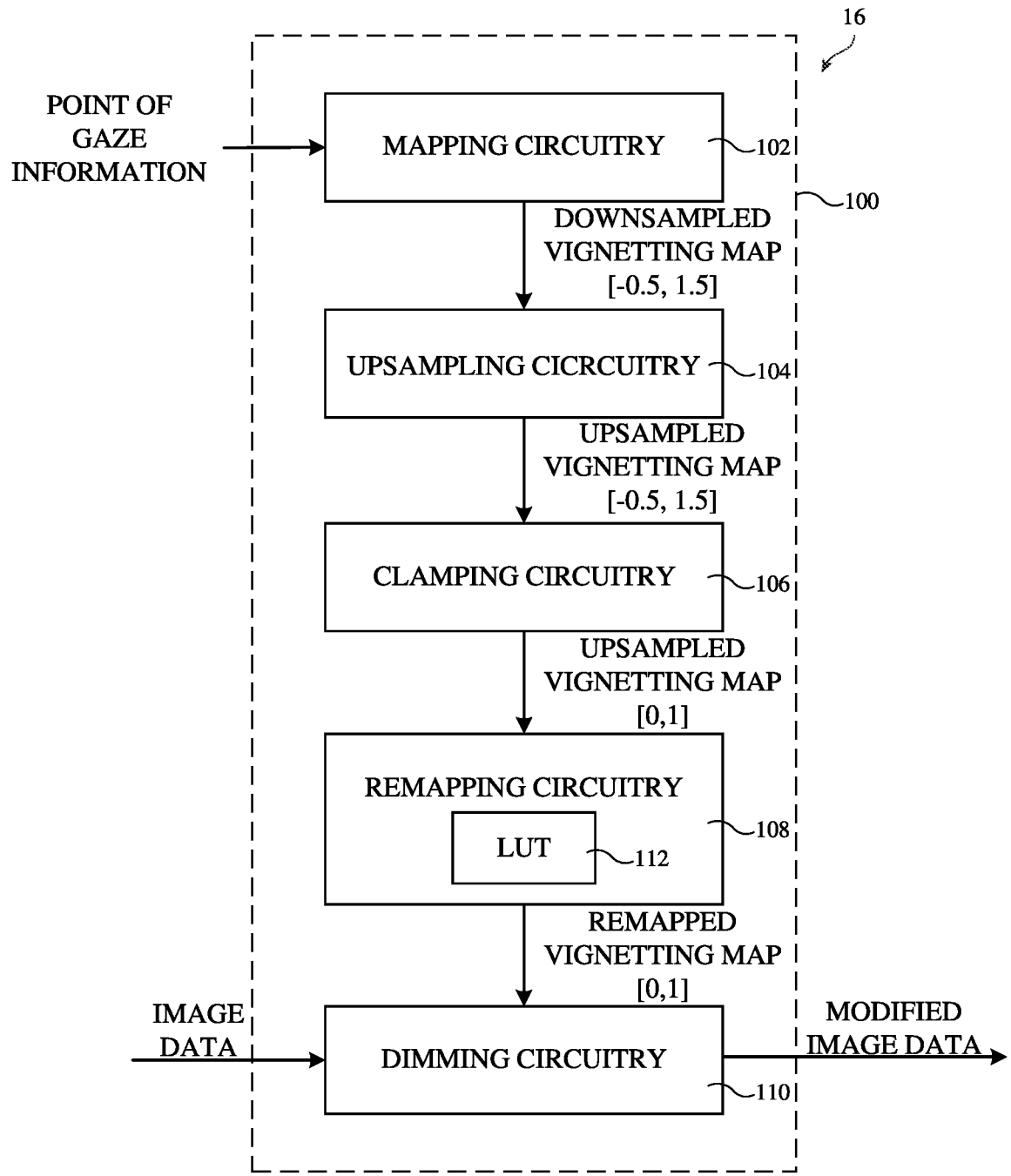
FIG. 11 is a diagram of illustrative control circuitry that may be used to apply a vignetting mask to a display in accordance with an embodiment.

Control circuitry 16 within electronic device 10 may determine and apply dimming factors to image data for the display to implement the desired vignetting mask. FIG. 11 is a schematic diagram of illustrative control circuitry that may apply a vignetting mask to each display frame. As shown, control circuitry 16 may include mapping circuitry 102, upsampling circuitry 104, clamping circuitry 106, remapping circuitry 108, and dimming circuitry 110. Mapping circuitry 102, upsampling circuitry 104, clamping circuitry 106, remapping circuitry 108, and dimming circuitry 110 may sometimes collectively be referred to as vignetting circuitry 100. It should be understood that each circuitry block in FIG. 11 may optionally run software to execute its desired functions and/or use hardware to execute its desired functions.

As shown in FIG. 11, mapping circuitry 102 may receive eye information such as point of gaze information. The eye information may also include information such as the location of a viewer's eye. The point of gaze information received by mapping circuitry 102 may be received from eye and/or headtracking system 18 (see FIG. 1).

Mapping circuitry 102 generates a downsampled vignetting map based on the received point of gaze information. The downsampled vignetting map may include an array of dimming factors for the display. Each dimming factor may correspond to a respective pixel in the display. However, the downsampled vignetting map only include dimming factors for a subset of the total number of pixels in the display. The downsampled vignetting map includes less than 1,000 rows of dimming factors, less than 200 rows of dimming factors, less than 100 rows of dimming factors, less than 75 rows of dimming factors, less than 50 rows of dimming factors, more than 50 rows of dimming factors, between 50 and 100 rows of dimming factors, between 60 and 70 rows of dimming factors, 64 rows of dimming factors, or any other desired number of rows of dimming factors. The downsampled vignetting map includes less than 1,000 columns of dimming factors, less than 200 columns of dimming factors, less than 100 columns of dimming factors, less than 75 columns of dimming factors, less than 50 columns of dimming factors, more than 50 columns of dimming factors, between 50 and 100 columns of dimming factors, between 60 and 70 columns of dimming factors, 64 columns of dimming factors, or any other desired number of columns of dimming factors.

The ratio of the number of rows of pixels in the display to the number of rows of dimming factors in the downsampled vignetting map may be greater than or equal to 2:1, greater than or equal to 3:1, greater than or equal to 4:1, greater than or equal to 6:1, greater than or equal to 10:1, greater than or equal to 20:1, greater than or equal to 50:1, greater than or equal to 100:1, between 2:1 and 10:1, between 2:1 and 20:1, between 2:1 and 50:1, etc. The ratio of the number of columns of pixels in the display to the number of rows of dimming factors in the downsampled vignetting map may be greater than or equal to 2:1, greater than or equal to 3:1, greater than or equal to 4:1, greater than or equal to 6:1, greater than or equal to 10:1, greater than or equal to 20:1, greater than or equal to 50:1, greater than or equal to 100:1, between 2:1 and 10:1, between 2:1 and 20:1, between 2:1 and 50:1, etc.

Mapping circuitry 102 may store a baseline downsampled vignetting map in memory. The mapping circuitry 102 may then align the downsampled vignetting map to actual pixels in the display based on the point of gaze information (e.g., aligning the vignetting map to the display based on the eye information).

Each dimming factor in the downsampled vignetting map produced by mapping circuitry 102 may be within a range of −0.5 to 1.5. Using an initial range of −0.5 to 1.5 for the dimming factors may mitigate artifacts caused by subsequent upsampling.

Upsampling circuitry 104 may receive downsampled vignetting map and upsample the dimming factors to produce an upsampled vignetting map. Each dimming factor in the upsampled vignetting map may still be within a range of −0.5 to 1.5. However, bilinear interpolation (or any other desired techniques) may be used to determine the dimming factor for each pixel in the display (not just the subset of pixels with dimming factors in the downsampled vignetting map).

Clamping circuitry 106 may modify the dimming factors in the upsampled vignetting map to be within the range of 0 to 1. Dimming factors less than 0 are clamped to 0. Dimming factors greater than 1 are clamped to 1. Spatial aliasing artifacts caused by the upsampling may mainly be present in the dimming factors greater than 1 and the dimming factors less than 0. The spatial aliasing artifacts do not affect the transition region of the vignetting mask (e.g., the values between 0 and 1). By clamping values greater than 1 to 1, the spatial aliasing artifacts are rendered moot.

The control circuitry may also optionally include remapping circuitry 108. Remapping circuitry 108 uses a look-up table (LUT) 112 to map each input dimming factor to a respective output dimming factor. The look-up table may have values approximating a desired remapping profile (e.g., the profile shown in FIG. 10). The remapping may ensure the vignetting mask has a desired appearance when perceived by a viewer. The remapped values may sometimes be referred to as a remapped vignetting map. The remapped values remain between 0 and 1 (or between 0% and 100%, with percentage notation).

Dimming circuitry 110 may receive image data for a given display frame. The image data (sometimes referred to as pixel data, pixel brightness data, initial brightness values, etc.) includes a brightness value for each pixel in the display. Dimming circuitry 110 receives the remapped vignetting map from remapping circuitry 108. For a given pixel, dimming circuitry 110 identifies the dimming factor from the remapped vignetting map for that pixel. The dimming factor for that pixel is then applied (e.g., multiplied by) the brightness value for that pixel. The result is modified image data that has been dimmed to form the desired vignetting mask. The output brightness value for each pixel in the modified image data is a function of the initial brightness value for that pixel in the initial image data and the dimming factor for that pixel.

It should be noted that the description in FIG. 11 of a full resolution vignetting map being produced by upsampling circuitry 104 and propagated to clamping circuitry 106, remapping circuitry 108, and dimming circuitry 110 is merely illustrative. In practice, it may be desirable for upsampling circuitry to identify the dimming factor for a single display pixel (e.g., using bilinear interpolation). The clamping circuitry may receive this single dimming factor and clamp the single dimming factor. The remapping circuitry may remap the single dimming factor. The dimming circuitry may then apply the remapped, single dimming factor to a respective brightness value to obtain a modified brightness value for that pixel. This process may then be repeated for each pixel in the display.

The dimming factors produced by mapping circuitry 102 and upsampling circuitry 104 have a range of between −0.5 and 1.5 whereas the dimming factors produced by clamping circuitry 106 and remapping circuitry 108 have a range of between 0 and 1. The magnitudes of these ranges are merely illustrative. It should be understood that any desired values may be used for each range. However, the first range (−0.5 to 1.5) may be greater than the second range (0 to 1). In this case, the magnitude of the first range is 2 whereas the magnitude of the second range is 1. The magnitude of the first range may be greater than 1, greater than 1.5, greater than 2, between 1.5 and 2.5, or any other desired magnitude. The ratio of the second range to the first range may be 2, greater than 1, greater than 1.5, greater than 2, between 1.5 and 2.5, or any other desired ratio.

Figure 12:
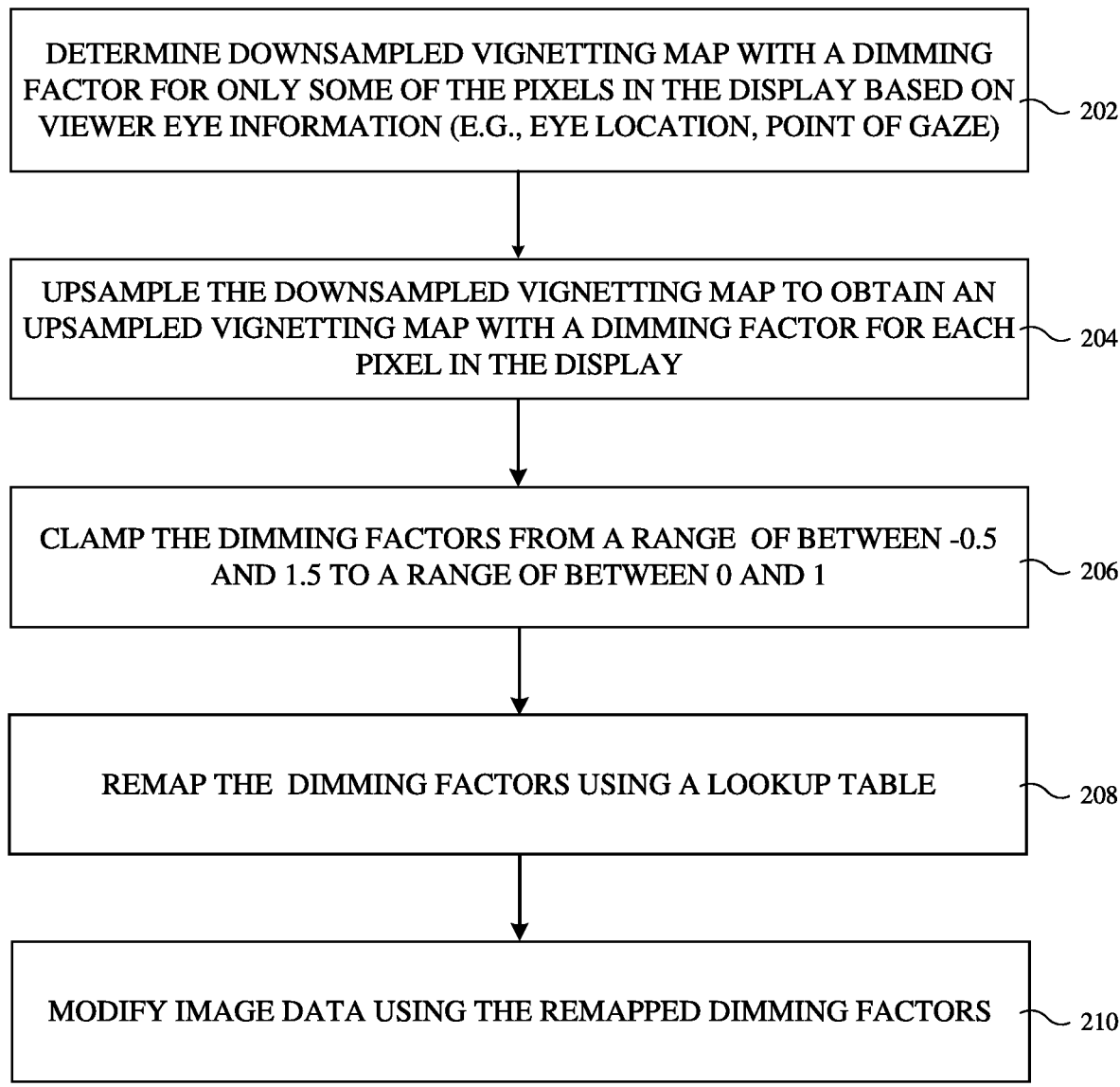
FIG. 12 is a flowchart of illustrative method steps that may be used to apply a vignetting mask to a display in accordance with an embodiment.

FIG. 12 is a flowchart of illustrative method steps that may be used by control circuitry 16 to apply dimming factors to the image data to implement a vignetting mask. First, at step 202, the control circuitry may determine a downsampled vignetting map that includes a dimming factor for only some of the pixels in the display. As one example, the downsampled vignetting map may include a 64×64 array of dimming factors. The downsampled vignetting map may be determined by the control circuitry based on viewer eye information (e.g., point of gaze information, eye location information, etc.). Each dimming factor in the downsampled vignetting map may have a range of −0.5 to 1.5. The lowest dimming factor in the downsampled vignetting map is −0.5. The highest dimming factor in the downsampled vignetting map is 1.5.

Next, at step 204, the control circuitry may upsample the downsampled vignetting map to obtain a dimming factor for each pixel in the display. Bilinear interpolation may be used to determine the dimming factor for each pixel based on the closest dimming factors (e.g., the dimming factors for the pixels that are closest in location to the given pixel) within the downsampled vignetting map. Each dimming factor in the upsampled vignetting map may have a range of −0.5 to 1.5. The lowest dimming factor in the upsampled vignetting map is −0.5. The highest dimming factor in the upsampled vignetting map is 1.5.

At step 206, the control circuitry may clamp the dimming factors from a range of −0.5 to 1.5 to a range of 0 to 1. Dimming factors greater than 1 are output with a value of 1. Dimming factors less than 0 are output with a value of 0. Clamping the dimming factors may ensure that the factors are all within the usable range of dimming factors. Additionally, because upsampling artifacts are present in the values greater than 1 and less than 0, the upsampling artifacts are removed during clamping.

Next, at step 208, each dimming factor may be remapped. As one example, a look-up table may be included in the control circuitry. The look-up table may include a plurality of input dimming factors and output dimming factors. Each input dimming factor is used to identify a corresponding output dimming factor using the look-up table. The output dimming factors are then used for subsequent processing.

At step 210, the control circuitry may modify the image data using the remapped dimming factors from step 208 (or from step 206 in the event that step 208 is omitted). Each pixel may have an initial brightness value in the image data for a given display frame. The dimming factor for that respective pixel (e.g., the remapped dimming factor from step 208) may be applied to the initial brightness value for that respective pixel. The dimming factor may be multiplied by the initial brightness value or other processing (e.g., another function) may be used to apply the dimming factor to the initial brightness value. The result is a modified brightness value for the respective pixel. The modified image data (with a modified brightness value for each pixel) is provided to the display (e.g., display driver circuitry) and displayed on the array of pixels.

The method of FIG. 12 may be repeated for each display frame during operation of the electronic device. In other words, the vignetting mask is applied to each frame of image data using the techniques of FIG. 12.

The foregoing is merely illustrative and various modifications can be made to the described embodiments. The foregoing embodiments may be implemented individually or in any combination.

The invention claimed is:

1. An electronic device comprising:
a display with an array of pixels; and
control circuitry configured to:
   determine an array of dimming factors, wherein the array has a first range and wherein the first range has a minimum that is less than 0;
   for each one of a plurality of pixels in the array of pixels, use bilinear interpolation and the array of dimming factors to obtain a dimming factor for that pixel;
   for each one of the plurality of pixels in the array of pixels, clamp the dimming factor for that pixel to be within a second range that is smaller than the first range; and
   modify brightness values for the array of pixels based on the clamped dimming factors.

2. The electronic device defined in claim 1, wherein the minimum is −0.5 and the first range has a maximum of 1.5.

3. The electronic device defined in claim 2, wherein the second range has a minimum of 0 and has a maximum of 1.

4. The electronic device defined in claim 1, wherein a magnitude of the first range is twice a magnitude of the second range.

5. The electronic device defined in claim 1, wherein the control circuitry is further configured to:
remap the clamped dimming factors using a look-up table.

6. The electronic device defined in claim 5, wherein remapping the clamped dimming factors produces remapped dimming factors and wherein the remapped dimming factors also have the second range and wherein modifying the brightness values for the array of pixels based on the clamped dimming factors comprises multiplying each brightness value by a respective remapped dimming factor.

7. The electronic device defined in claim 1, wherein determining the array of dimming factors comprises determining the array of dimming factors based on point of gaze information.

8. The electronic device defined in claim 7, further comprising:
an eye tracking system configured to obtain the point of gaze information.

9. The electronic device defined in claim 1, wherein the array of dimming factors represents a vignetting mask for the display.

10. The electronic device defined in claim 1, wherein the first range has a maximum that is greater than 1.

11. An electronic device comprising:
a display with an array of pixels;
an eye tracking system that is configured to obtain point of gaze information; and
control circuitry configured to:
determine an array of dimming factors for the array of pixels based on the point of gaze information;
selectively modify the array of dimming factors to reduce the range of the array of dimming factors, wherein selectively modifying the array of dimming factors to reduce the range of the array of dimming factors comprises reducing dimming factors over 1 to be equal to 1; and
apply the modified dimming factors to pixel data to obtain modified pixel data.

12. The electronic device defined in claim 11, wherein selectively modifying the array of dimming factors to reduce the range of the array of dimming factors comprises reducing the range of the array of dimming factors by a factor of 2.

13. The electronic device defined in claim 11, wherein determining the array of dimming factors for the array of pixels based on the point of gaze information comprises:
determining an initial array of dimming factors based on the point of gaze information; and
using bilinear interpolation to determine additional dimming factors for the array of dimming factors.

14. The electronic device defined in claim 11, wherein selectively modifying the array of dimming factors to reduce the range of the array of dimming factors comprises increasing dimming factors less than 0 to be equal to 0.

15. The electronic device defined in claim 11, wherein the control circuitry is further configured to:
after selectively modifying the array of dimming factors to reduce the range of the array of dimming factors, remap the array of dimming factors using a look-up table.

16. An electronic device comprising:
a display with an array of pixels; and
vignetting circuitry configured to apply a vignetting effect to the display, wherein the vignetting circuitry is configured to:
determine a first array of dimming factors, wherein the first array has a first range;
use the first array to determine a second array of dimming factors, wherein the second array has a second range that is the same as the first range and wherein the second array has a greater number of dimming factors than the first array;
modify the second array of dimming factors to obtain a third array of dimming factors, wherein the third array has a third range that is smaller than the second range; and
modify image data for the array of pixels using the third array of dimming factors.

17. The electronic device defined in claim 16, wherein using the first array to determine the second array of dimming factors comprises using bilinear interpolation and the first array to determine the second array of dimming factors.

18. The electronic device defined in claim 16, wherein modifying the second array of dimming factors to obtain the third array of dimming factors comprises clamping the second array of dimming factors.

19. The electronic device defined in claim 16, wherein the vignetting circuitry is further configured to remap the third array of dimming factors using a look-up table.

* * * * *